_United States Patent_ [19]

Hord, Jr.

[11] 3,771,816
[45] Nov. 13, 1973

[54] KINGPIN ASSEMBLY
[76] Inventor: Robert E. Hord, Jr., Box 635, Granite City, Ill. 62040
[22] Filed: Mar. 15, 1972
[21] Appl. No.: 234,858

[52] U.S. Cl. .................................. 280/433, 73/40
[51] Int. Cl. ............................................ B62d 53/08
[58] Field of Search ........................ 280/432, 433; 116/114; 73/40, 40.7

[56] References Cited
UNITED STATES PATENTS
| | | | |
|---|---|---|---|
| 2,601,840 | 7/1952 | Smith et al. | 116/114 X |
| 2,915,320 | 12/1959 | Jewell et al. | 280/433 X |
| 3,027,754 | 4/1962 | Alquist et al. | 73/40.7 X |
| 3,252,715 | 5/1966 | Chieger et al. | 280/433 X |
| 3,691,820 | 9/1972 | Fiore | 73/40.7 X |

Primary Examiner—Leo Friaglia
Assistant Examiner—R. Schrecengost
Attorney—Thomas B. Van Poole et al.

[57] ABSTRACT

A kingpin assembly is disclosed in a trailer frame with the kingpin extending through a hollow chamber defined by the frame members with the kingpin extending through the chamber and the interior of the chamber being pressurized with a dye carrying and/or odor producing substance which will escape from the chamber upon failure of the connection of the kingpin to the trailer frame or upon failure of any part of the trailer frame forming the chamber.

10 Claims, 3 Drawing Figures

PATENTED NOV 13 1973　　　　　　　　　　　　　3,771,816
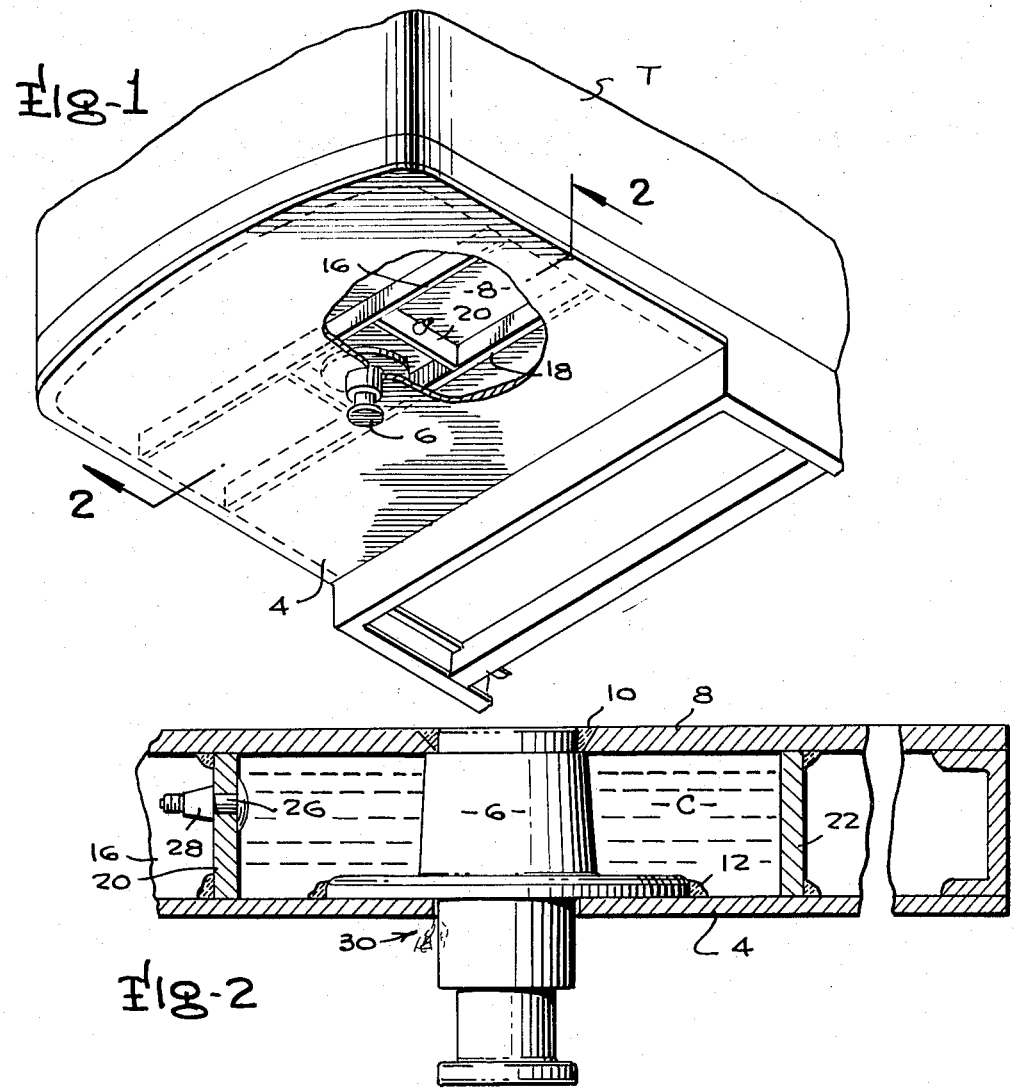
Fig-1
Fig-2
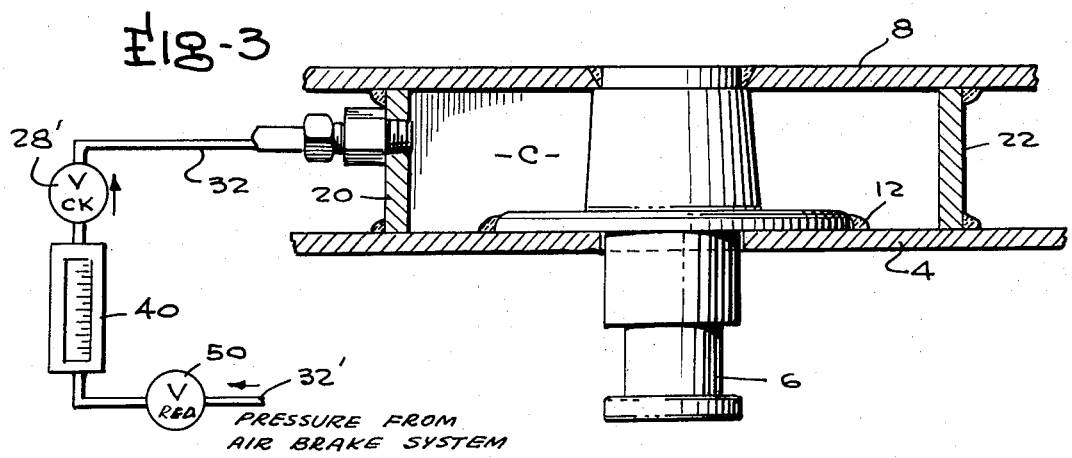
Fig-3
PRESSURE FROM AIR BRAKE SYSTEM

KINGPIN ASSEMBLY

This invention is in the field of trailer constructions and is specifically directed to a kingpin construction for an over-the-road type trailer.

Kingpins are presently attached to trailers by attachment to the front end of the trailer frame through welding or other conventional attachment means. Frequently, the connection of the kingpin to the trailer frame becomes damaged so that the kingpin becomes loose with respect to the frame and is consequently unsafe for normal road usage. Moreover, a damaged kingpin on a truck trailer is also unsafe in rail piggy-back operations when the trailer is being hauled on a railroad flatcar.

Unfortunately, kingpins are positioned on the bottom side of the trailer frame and are difficult to inspect by virtue of their position and also by virtue of the fact that they are usually covered with grease and grime so that visual inspection frequently fails to reveal a broken or loose kingpin. The present method of detecting such broken or loose kingpins is by striking the kingpin with a hammer to determine by sound and/or sight whether or not the kingpin is either loose or broken.

Additionally, it is impossible to inspect a kingpin when the trailer is connected to the truck tractor since it is necessary to disconnect the trailer and leave it standing on its landing legs in order to visually examine the kingpin. The inconvenience of disconnecting the trailer obviously constitutes a substantial impediment to frequent inspections of kingpins on trailers connected to truck tractors.

Therefore, it is the primary object of this invention to provide a new and improved means capable of providing an immediate indication of kingpin failures regardless of whether or not the trailer is attached to a truck.

A still further object of this invention is the provision of means for enabling the detection of a kingpin failure by visual inspection and by the sense of smell.

Obtainment of the objects of this invention is enabled through the provision of a trailer frame defining a hollow sealed chamber through which the kingpin extends. The kingpin is welded to the frame components on the interior of the chamber and a pressure line is connected to the chamber for enabling pressurization thereof. A dye is provided on the interior of the chamber so that the pressurized air in the chamber will blow the dye outwardly through any crack or other failure of the kingpin or the chamber to provide a visual indication of such failure. In addition, the material on the interior of the chamber can include an odor producing compound which will provide a further olfactory indication of such failure.

The manner in which the preferred embodiment of the invention accomplishes the foregoing objects will be better understood when the following written description is considered in conjunction with the appended drawings in which:

FIG. 1 is a perspective view of the underside of a trailer employing the preferred embodiment of the invention;

FIG. 2 is a sectional view taken along lines 2—2 of FIG. 1; and

FIG. 3 is a sectional view similar to FIG. 2 but illustrating a second embodiment of the invention.

Attention is initially invited to FIG. 1 of the drawings which illustrates the forward end of a trailer T which includes a base frame plate 4 from which a kingpin 6 extends. An upper frame plate 8 extends parallel to the lower frame plate 4 and the upper end of the kingpin 6 extends into an aperture in the upper frame plate 8 and is welded to the wall of the aperture as shown at 10. The lower end of kingpin 6 extends through an aperture in the base frame plate 4 and is welded to the base frame plate by a circular weld 12 as shown in FIG. 2. A chamber C is defined about the kingpin 6 by transversely extending frame members 16 and 18 extending transversely with respect to the trailer and longitudinally extending side frame members 20 and 22.

Therefore, it will be seen that the chamber C is bounded about its periphery by the frame members 20, 22 and portions of the frame members 16 and 18 and is bounded on the bottom by the frame plate 4 and on the top by the frame plate 8.

The connection between the side frame members 20, 22 and the transverse frame members 16, 18 with each other and with the upper plate and lower plate 4 and 8 are welded to provide an air tight construction for the chamber. An aperture 26 extends through the side frame members 20 and supports a one-way check valve 28 to which can be connected an air line or other pressure source for pressurizing the interior of the chamber. The air or other medium on the interior of chamber C carries either liquid or powder dye which in the event of a failure of the kingpin or of the weld connecting the kingpin to the frame members or of any part of the frame members forming the chamber C can escape as shown at 30 to provide a visual indication of the failure of the construction. In addition, the interior of the chamber can be provided with an odor producing media which could provide a strong odor indicative of such failure.

FIG. 3 illustrates a second embodiment of the invention in which the elements are essentially identical to those of FIG. 2 but in which the chamber C is provided with a permanent pressure line 32 connected through a check valve 28' to a rotameter 40 and including a pressure relief or control valve 50. The pressure line 32' extending from the valve 50 is connected to the air brake system of the trailer so that upon pressurization of the air brake system, the chamber C is immediately pressurized. However, upon the deactivation of the air brake system, it should be noted that the check valve will maintain the chamber in a pressurized condition. In addition, the rotameter 40 provides a visual indication of air flow in the event of any small leakage from the chamber C. Such a construction would be of particular value in nighttime operation in which the dye carried on the interior of the chamber might not be visible in the event of failure of the kingpin or chamber construction.

Numerous modifications of the subject invention will undoubtedly occur to those of skill in the art; however, it should be understood that the spirit and scope of the invention it to be limited solely in light of the appended claims.

I claim:

1. A kingpin assembly mounted in a trailer frame comprising frame members defining a hollow chamber, a kingpin extending into said hollow chamber and weldingly connected to the frame members in the chamber and a pressurized dye carrier in said chamber which will escape from the chamber in the event of failure of the weld connecting the kingpin to the frame members or of the frame members per se to provide a visual indication of such failure externally of the chamber.

2. The invention of claim 1 wherein said kingpin extends through said chamber and is connected to flat frame plate members on opposite sides of the chamber.

3. The invention of claim 2 wherein said chamber is provided with a pressurization aperture connected to a pressure line through a check valve which prevents the escape of pressure from said chamber following pressurization thereof.

4. The invention of claim 3 wherein said pressure line is connected to the air brake system of the trailer.

5. The invention of claim 4 additionally including a rotameter connected in the pressure line to provide an indication of any pressure leakage from the chamber.

6. The invention of claim 1 wherein said pressurized dye carrier includes odor producing means to provide an olfactory indication of any leakage from the chamber.

7. The invention of claim 6 wherein said kingpin extends through said chamber and is connected to flat frame plate members on opposite sides of the chamber.

8. The invention of claim 7 wherein said chamber is provided with a pressurization aperture connected to a pressure line through a check valve which prevents the escape of pressure from said chamber following pressurization thereof.

9. The invention of claim 8 wherein said pressure line is connected to the air brake system of the trailer.

10. The invention of claim 9 additionally including a rotameter connected in the pressure line to provide an indication of any pressure leakage from the chamber.

* * * * *